United States Patent [19]

Postma et al.

[11] Patent Number: 5,933,298

[45] Date of Patent: Aug. 3, 1999

[54] SYSTEM COMPRISING A MAGNETIC HEAD, MEASURING DEVICE AND A CURRENT DEVICE

[75] Inventors: Lambertus Postma; Gerardus H.J. Somers; Jacobus J.M. Ruigrok, all of Eindhoven, Netherlands

[73] Assignee: U.S. Philips Corporation, New York, N.Y.

[21] Appl. No.: 08/618,229

[22] Filed: Mar. 19, 1996

[30] Foreign Application Priority Data

Mar. 24, 1995 [EP] European Pat. Off. .............. 95200743

[51] Int. Cl.⁶ .................................................. G11B 5/127
[52] U.S. Cl. ............................................................ 360/113
[58] Field of Search ........................... 360/113, 125–127; 29/603.16

[56] References Cited

U.S. PATENT DOCUMENTS

| | | | |
|---|---|---|---|
| 3,921,217 | 11/1975 | Thompson | 360/113 |
| 4,789,910 | 12/1988 | Otsuka et al. | 360/113 |
| 5,218,755 | 6/1993 | Gassen et al. | 360/113 |
| 5,258,883 | 11/1993 | Ruigrok | 360/113 |
| 5,270,895 | 12/1993 | Ruigrok et al. | 360/113 |
| 5,408,377 | 4/1995 | Gurney et al. | 360/113 |
| 5,483,735 | 1/1996 | Postma et al. | 360/113 |
| 5,531,016 | 7/1996 | Postma et al. | 360/113 |
| 5,546,254 | 8/1996 | Gill | 360/113 |
| 5,552,706 | 9/1996 | Carr | 360/113 |
| 5,604,651 | 2/1997 | Asselin | 360/113 |

FOREIGN PATENT DOCUMENTS

| | | |
|---|---|---|
| 0445883A1 | 9/1991 | European Pat. Off. . |
| A60140516 | 7/1985 | Japan . |
| A61237218 | 10/1986 | Japan . |
| A62146420 | 6/1987 | Japan . |
| A6352315 | 3/1988 | Japan . |
| 63-157251 | 1/1990 | Japan . |

*Primary Examiner*—Allen T. Cao
*Attorney, Agent, or Firm*—John C. Fox

[57] ABSTRACT

System comprising a magnetic head (1) and a measuring device connected to the magnetoresistive element. The magnetic head has a head face (5) with a transducing gap (15) and comprises a magnetoresistive element (13) and a magnetically conducting yoke with an electrically conducting element (11*a*) for generating a magnetic field intersecting the magnetoresistive element. The system also comprises a current device connected to the electrically conducting element.

6 Claims, 2 Drawing Sheets

SYSTEM COMPRISING A MAGNETIC HEAD, MEASURING DEVICE AND A CURRENT DEVICE

BACKGROUND OF THE INVENTION

The invention relates to a system comprising a magnetic head for detecting information-representing magnetic fields originating from a medium which is movable with respect to the magnetic head, particularly a magnetic recording medium, said magnetic head having a head face with a transducing gap and a magnetically conducting yoke, a magnetoresistive element and an electrically conducting element for generating a magnetic field intersecting the magnetoresistive element, a measuring device connected to the magnetoresistive element and a current device connected to the electrically conducting element.

The invention also relates to a magnetic head having a head face with a transducing gap and a magnetically conducting yoke, a magnetoresistive element and an electrically conducting element for generating a magnetic field intersecting the magnetoresistive element.

Such a system and magnetic head are known from U.S. Pat. No. 3,921,217. The known magnetic head may be a thin-film magnetic head which, starting from a substrate, is built up lengthwise. The known magnetic head comprises two aligned flux-guiding layer parts of a magnetically permeable material between which a gap is present, with a magnetoresistive element bridging the gap. Together with the magnetically conducting substrate, said layer parts form a magnetic yoke for supplying a magnetic flux from a recording medium to the magnetoresistive element, and for returning magnetic flux from the magnetoresistive element to the recording medium. To linearize the reproduction characteristic of the magnetoresistive element, an electrically conducting layer extending parallel to the magnetoresistive element is provided.

Upon the passage of current, a permanent magnetic field is applied at which the magnetoresistive element is magnetically biased in order to set a working point in a linear area of the resistance-magnetic field curve of the magnetoresistive element.

In the known magnetic head, the magnetoresistive element is situated between said flux-guiding layer parts and the magnetically conducting substrate, while a read gap extends between one of the flux-guiding layer parts and the substrate. For technological reasons, the read gap is composed of at least two insulation layers each having such a layer thickness that short-circuit between the magnetoresistive element and the flux-guiding layer parts or the substrate is prevented. Such a configuration has the drawback that it is technologically very difficult to realise very small gap lengths.

The general trend is to try to achieve larger information densities on recording media. One of the measures to that end is to record information at increasingly smaller wavelengths. This implies that very small gap lengths are necessary, not only for writing but also for reading information.

In the known magnetic head, the electrically conducting layer for applying a permanent magnetic field is outside the magnetic yoke. The known magnetic head forms part of a system which also comprises a current source connected to the electrically conducting layer, and a measuring device connected to the magnetoresistive element.

OBJECTS AND SUMMARY OF THE INVENTION

It is an object of the invention to improve the system and the magnetic head described in the opening paragraph in such a way that transducing gaps having very small gap lengths can be realised in a technologically simple manner.

The system according to the invention is characterized in that the electrically conducting element of the magnetic head is magnetically conducting and forms part of the magnetically conducting yoke.

In the system according to the invention, the electrically conducting element is integrated with the magnetic yoke. This means that, during manufacture of the system, the transducing gap can be formed from only one insulation layer in a technologically simple manner. This provides a large freedom of choice as regards gap lengths, and particularly microgaps can be realised with a few number of technological steps by means of the measures taken. A further advantage is that the magnetic yoke proximate to the magnetoresistive element may comprise one or more flat flux-guiding elements which, due to the absence of transitions, particularly stepped transitions, are magnetically stable and have a favourable shape anisotropy.

It is to be noted that a thin-film magnetic head is known from U.S. Pat. No. 4,789,910, in which a magnetoresistive element is arranged above a bias guide and the magnetoresistive element and the bias guide are situated within one and the same magnetic yoke. A thin-film magnetic head is known from JP-A 2-5218, in which an electric conductor is situated within a magnetic yoke, while a magnetoresistive element is situated outside said yoke and bridges a gap between two flux guides. In these two known magnetic heads, the space within the magnetic yoke is formed from several layers, which yields great technological problems during manufacture as regards the realisation of a transducing gap having a small gap length. Both known magnetic heads have the further drawback that during manufacture additional planarization operations must be performed in order to obtain a plane supporting face on which the magnetoresistive element can be formed. If the magnetoresistive element in a magnetic head is present on an uneven or irregular surface, this will give rise to disturbed domain patterns, hence to instabilities.

Due to their structure, the known magnetic heads do not have flat flux-guiding layers. In fact, proximate to the magnetoresistive element, the layers have slanting parts. This has the drawback that staggered domain walls may be present between the slanting parts and the other parts, so that Barkhausen noise is produced.

An embodiment of the system according to the invention, in which the magnetically conducting yoke comprises a first flux-guiding element adjacent to the head face and, spaced apart from the head face, a second flux-guiding element, between which flux-guiding elements a gap bridged by the magnetoresistive element is present, is characterized in that the electrically conducting element constitutes the second flux-guiding element. In this embodiment the gap height of the transducing gap, viewed in a direction transverse to the head face, may be small. An advantage thereof is that there is only a small loss of flux due to magnetic flux crossing in the transducing gap.

The magnetic head according to the invention is characterized in that the electrically conducting element is magnetically conducting and forms part of the magnetically conducting yoke, while connection faces are present for electrically connecting said conducting element to a current device.

In the magnetic head according to the invention the electrically conducting element is integrated in the magnetic yoke, which results in a magnetic head having a simple structure. The transducing gap can be structured from one layer without any extra technological steps such as etching. The layer may be formed by means of known techniques such as sputtering or vapour deposition. Suitable materials are, for example $Al_2O_3$, $SiO_2$ or $ZrO_2$. A suitable electrically and magnetically conducting material for the conducting element is, for example an NiFe alloy or a CoZrNb alloy.

The magnetoresistive element preferably has an easy axis of magnetization which coincides with the longitudinal direction of the magnetoresistive element. The magnetoresistive element may further comprise a pattern of equipotential strips which extend at an angle of, for example approximately 45° to the easy axis of magnetization. The magnetoresistive element may also be of a giant magnetoresistive type, in which case equipotential strips are not necessary. At a relative displacement of the magnetoresistive element and a magnetic recording medium, the magnetic field of the recording medium causes changes in the magnetization of the magnetoresistive element and modulates its resistance via the magnetoresistance effect. This means that for a passing magnetic medium the information-representing magnetic fields present on the medium rotate the magnetization within the magnetoresistive element, at which the resistance changes. The measuring device connected to the magnetic head may thereby supply an output signal in the form of current or voltage fluctuations which represent the information stored in the recording medium. The flux-guiding part of the magnetic yoke which also functions as an electrically conducting element can be used after connection to a current source for magnetically biasing the magnetoresistive element. It is also possible to use the electrically conducting element as a test winding, write winding, ac and/or dc bias winding or reset winding.

The magnetic head according to the invention is suitable for use in the system according to the invention and may be implemented as an individual read head or form part of a combined read/write head. The magnetic head is particularly suitable as a multichannel head and may be used for audio, video or data purposes.

An embodiment of the magnetic head according to the invention, in which the magnetically conducting yoke comprises a flux-guiding element adjacent to the head face, is characterized in that a gap, which is bridged by the magnetoresistive element, extends between the flux-guiding element adjacent to the head face and the electrically conducting element which is spaced apart from the head face. The flux-guiding element adjacent to the head face may be relatively short so as to limit flux losses via the transducing gap. This flux-guiding element ensures the supply of flux to the magnetoresistive element. The other flux-guiding element has a double function. On the one hand, this flux-guiding element ensures the flux return from the magnetoresistive element and on the other hand it ensures a magnetic field at the location of the magnetoresistive element.

The flux-guiding element adjacent to the head face and the electrically conducting element can be implemented in a flat form without any extra technological steps, which has a favourable effect on the shape anisotropy and the magnetic stability and thus particularly on the noise behaviour of the magnetic head.

An embodiment of the magnetic head according to the invention is characterized in that the magnetic head is a multichannel head having a plurality of transducing gaps, in which the electrically conducting element is a common flux-guiding element. The common flux-guiding element is an elongated, uninterrupted layer part having an eminent shape anisotropy. Due to the absence of separate electric conductors such as a bias winding, the flux-guiding element is not hindered by electric connection tracks.

An embodiment of the magnetic head according to the invention is characterized in that the electrically conducting element and the flux-guiding element adjacent to the head face are flat layer parts of a thin-film structure. The flat layer parts have a favourable effect on the stability of the magnetic head.

The invention also relates to a method of manufacturing the magnetic head according to the invention.

The method according to the invention is characterized by the following steps: forming an insulation layer on the basis of magnetically permeable material by depositing an electrically insulating material, forming a layer-shaped flux-guiding element on the insulation layer by depositing an electrically conducting, magnetically permeable material, forming connection faces being in electrical contact with the flux-guiding element, and forming a layer-shaped magnetoresistive element after forming the flux-guiding element.

In the thin-film magnetic head thus obtained by means of a relatively small number of technological steps, the thickness of the insulation layer is determined by the length of the transducing gap because this is formed by the relevant layer. The method can be performed by means of a limited number of known thin-film techniques. The connection faces can be directly provided on the flux-guiding element, or elsewhere, in which case electrical through-connections are necessary.

An embodiment of the method according to the invention is characterized in that, prior to forming the magnetoresistive element, electrically insulating material is deposited, whereafter planarization is performed, for example by means of mechanochemical polishing.

These and other aspects of the invention will be apparent from and elucidated with reference to the embodiments described hereinafter.

DESCRIPTION OF THE PREFERRED EMBODIMENTS

Figure 1:
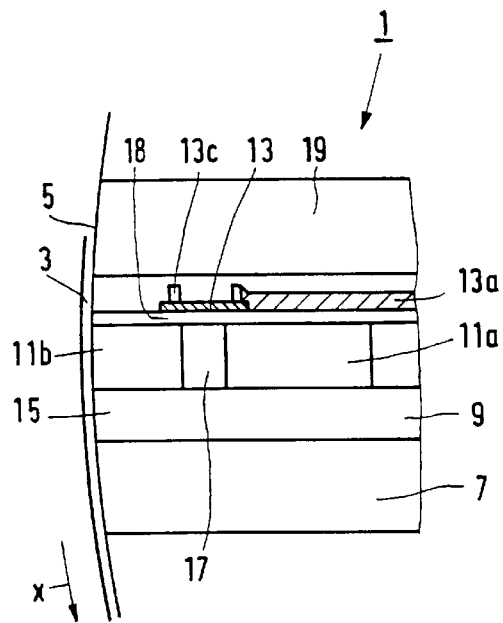
FIG. 1 is a diagrammatic longitudinal section of a first embodiment of the magnetic head according to the invention.
Figure 2:
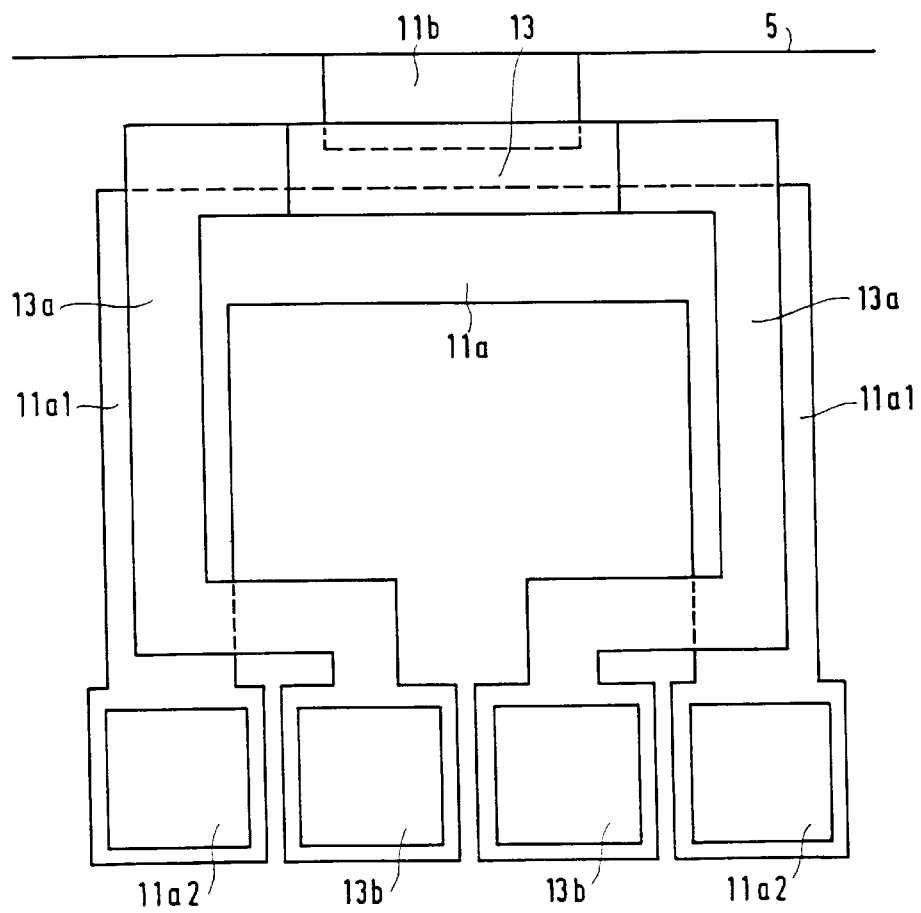
FIG. 2 is a diagrammatic cross-section of the first embodiment.

The magnetic head 1 according to the invention, shown in FIGS. 1 and 2, is particularly intended for magnetically scanning magnetic recording media such as a magnetic tape 3, for example an audio tape. The magnetic head 1, which has a head face 5 across which the magnetic tape can be moved in a direction x, is a thin-film magnetic head having a magnetically conducting substrate 7 provided with a thin-film structure. The thin-film structure is composed of a plurality of layers, such as an insulation layer 9 located on the substrate 7, two flat layer parts of a magnetically conducting material located on the insulation layer 7 for forming a first flux-guiding element 11a and a second flux-guiding element 11b, and a layer part of a magnetoresistive material located above the flux-guiding elements 11a and 11b for forming a magnetoresistive element 13. Together with the flux-guiding elements 11a and 11b, the substrate 7, which is manufactured of a magnetically conducting material, in this example an NiZn ferrite, constitutes a magnetic yoke for the magnetoresistive element 13. The insulation layer 9 extending between the substrate 7 and the flux-guiding element 11b and being formed by deposition of a non-magnetizable material, in this example $SiO_2$, constitutes a transducing gap terminating in the head face 5, particularly a read gap 15. A space or gap 17 filled with a non-magnetic material, in this example $SiO_2$, which gap is bridged by the magnetoresistive element 13, is present between the flux-guiding elements 11a and 11b. The flux-guiding elements 11a and 11b are formed from a magnetically and electrically conducting material, in this example an NiFe alloy, in which the first flux-guiding element 11a, which elsewhere in this document is also referred to as an electrically conducting element, is provided with electrically conducting connection tracks 11a1 terminating in connection faces 11a2. The second flux-guiding element 11b adjacent to the head face 5 does not need to be electrically conducting and, if desired, may be formed from a magnetically conducting, electrically insulating material. The magnetoresistive element 13, which is provided with equipotential strips in this example, is connected to connection faces 13b by means of electrically conducting connection tracks 13a.

Figure 3:
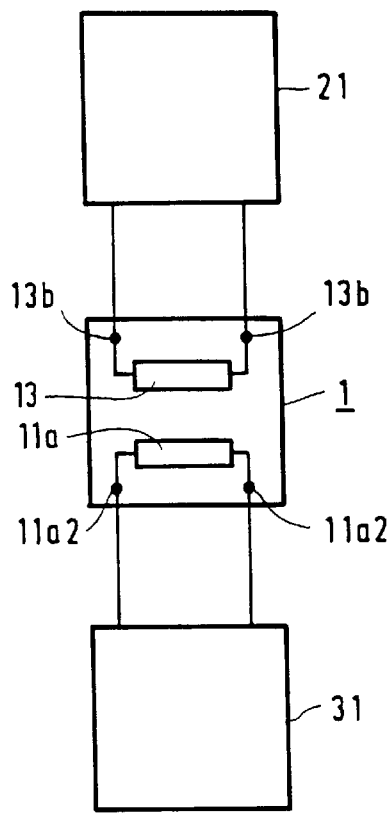
FIG. 3 shows diagrammatically an embodiment of the system according to the invention and FIG. 4 shows a second embodiment of the magnetic head according to the invention.

The diagram shown in FIG. 3 shows the magnetic head in the connected state. The magnetic head 1 forms part of a system which also comprises a measuring device 21 and a current device 31. The measuring device 21 is electrically connected to two ends of the magnetoresistive element 13 via the connection faces 13b. The current device 31, such as a DC source, is electrically connected to the electrically conducting element 11a via the connection faces 11a2. Upon supply of current, the element 11a produces a magnetic field which intersects the magnetoresistive element 13.

The magnetic head according to the invention may be manufactured by means of known thin-film techniques. In this case it is not important whether the starting material is a magnetically conducting substrate or a magnetically non-conducting substrate on which a structured or non-structured magnetically conducting layer is provided.

The method according to the invention will now be described with reference to FIGS. 1 and 2. The method comprises the deposition of an electrically insulating material such as $SiO_2$, $Al_2O_3$ or $ZrO_2$ for forming the insulation layer 9 on the basis of magnetically permeable material such as the substrate 7. The insulating material may be provided by sputtering, PECVD or another suitable deposition method. A magnetically and electrically conducting layer is formed by means of, for example sputtering deposition of a magnetically and electrically conducting material such as an NiFe alloy or a CoZrNb alloy on the flat surface of the insulation layer 9 obtained after possible polishing or lapping. The magnetically and electrically conducting elements 11a and 11b are formed from the layer thus formed by structuring, for example by means of a photoresist mask and etching, in which the thickness of the single insulation layer 9 defines the gap length of the read gap or transducing gap 15. The connection tracks 11a1 and the connection faces 11a2 are formed simultaneously with the formation of the electrically conducting element 11a. If the connection faces are positioned at a different level in the thin-film structure, their formation may take place in a different step. After the formation of the elements 11a and 11b, insulating material such as $SiO_2$, $Al_2O_3$ or $ZrO_2$ is deposited, at which the space or gap 17 between the flat conducting elements 11a and 11b is filled up. Subsequently, polishing takes place, preferably in a mechanochemical way, for forming a flat and smooth surface on which a thin spacer layer 18 of a non-magnetic, electrically insulating material such as $SiO_2$, $Al_2O_3$ or $ZrO_2$ is formed, on which the magnetoresistive element 13 is formed by deposition of a magnetoresistive material, for example sputtering an alloy of NiFe, followed by structuring. Subsequently, a layer of an electrically conducting material, for example Au is provided on the magnetoresistive element 13, which layer is structured, for example by means of a photoresist mask and etching to equipotential strips 13c having a barberpole structure, the electrically conducting connection tracks 13a and the connection faces 13b. Subsequently, a protective counterblock 19 of, for example $BaTiO_3$ or $CaTiO_3$ is secured by gluing after formation of an insulating layer. The assembly obtained is provided with a head face 5 by means of operations, for example grinding and/or lapping.

Figure 4:
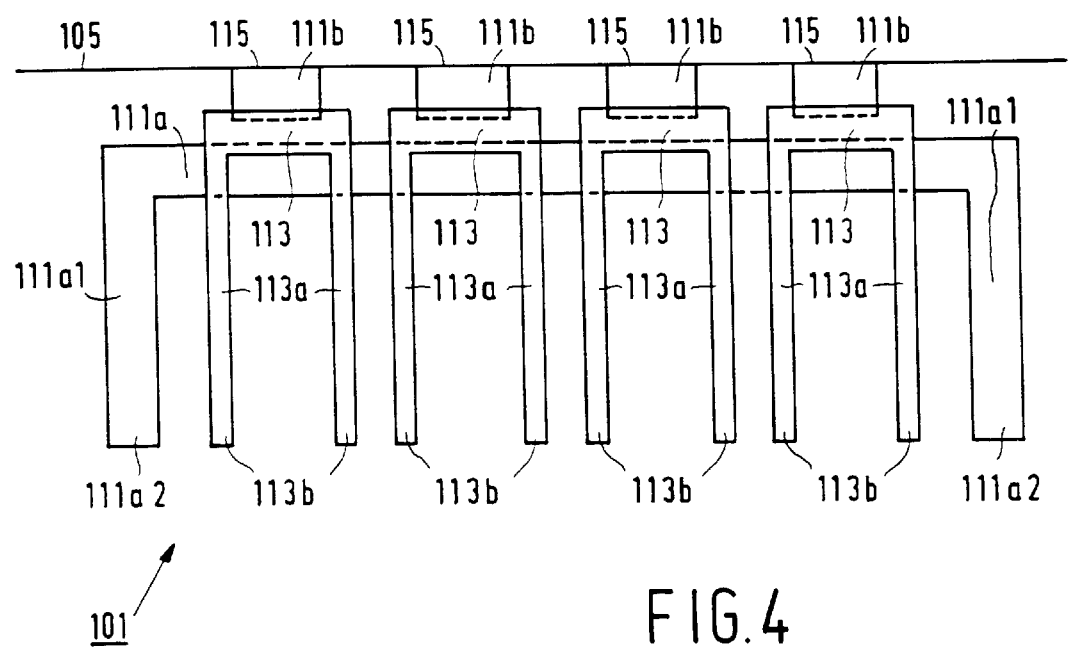

The magnetic head according to the invention, shown in FIG. 4, is a multichannel head 101 which has a head face 105 for cooperation with a recording medium provided with a plurality of magnetic tracks, such as a magnetic tape or a magnetic disc. The magnetic head 101 has a plurality of transducing gaps 115 terminating in the head face 105, which gaps each extend between a flux-guiding element 111b, adjacent to the head face 105, of a magnetically conducting yoke and a part of the magnetically conducting yoke adjacent to the head face and extending parallel to the element 111b, and which gaps terminate in the head face 105. All flux-guiding elements 111b are coplanar. The magnetic head 101 also has a plurality of magnetoresistive elements 113 corresponding to the plurality of transducing gaps 115, each element being provided with electrically conducting connection tracks 113a and connection faces 113b. The magnetic head further has an electrically conducting element 111a which is also magnetically conducting and forms part of the magnetic yoke. The electrically conducting element 111a is spaced apart from the flux-guiding elements 111b, the distance being bridged by the magnetoresistive elements 113. The element 111a may not only be used as a magnetically conducting yoke part but also as an electric winding, for example a bias winding or a test winding. For this reason, the magnetic head 101 has electrically conducting connection tracks 111a1 which terminate in connection faces 111a2.

It is to be noted that the invention is not limited to the examples shown. The magnetic head according to the invention may particularly form part of a combined read/write head.

We claim:

1. A system comprising;
   (a) a magnetic head for detecting information-representing magnetic fields originating from a medium which is movable with respect to he magnetic head, said magnetic head having a head face with a transducing gap and a magnetically conducting yoke, a magnetoresistive element and an electrically conducting element for generating a magnetic field intersecting the magnetoresistive element;
   (b) a measuring device connected to the magnetoresistive element; and
   (c) a current device connected to the electrically conducting element;

characterized in that the electrically conducting element of the magnetic head is magnetically conducting and forms part of the magnetically conducting yoke, and is separated from the magnetoresistive element by an electrically insulating layer.

2. A system as claimed in claim 1, in which the magnetically conducting yoke comprises a first flux-guiding element adjacent to the head face and, spaced apart from the head face, a second flux-guiding element, the first and second flux-guiding elements defining a gap therebetween, and in which the magnetoresistive element bridges the gap, characterized in that the electrically conducting element constitutes the second flux-guiding element.

3. A magnetic head for detecting information-representing magnetic fields originating from a medium which is movable with respect to the magnetic head, the magnetic head having a head face with a transducing gap and a magnetically conducting yoke, a magnetoresistive element and an electrically conducting element for generating a magnetic field intersecting the magnetoresistive element, characterized in that the electrically conducting element of the magnetic head is magnetically conducting and forms part of the magnetically conducting yoke, and is separated from the magnetoresistive element by an electrically insulating layer, and connection faces are provided for electrically connecting said conducting element to a current device.

4. A magnetic head as claimed in claim 3, in which the magnetically conducting yoke comprises a flux-guiding element adjacent to the head face, characterized in that a gap which is bridged by the magnetoresistive element extends between the flux-guiding element adjacent to the head face and the electrically conducting element which is spaced apart from the head face.

5. A magnetic head as claimed in claim 3, characterized in that the magnetic head is a multichannel head having a plurality of transducing gaps, in which the electrically conducting element is a common flux-guiding element.

6. A magnetic head as claimed in claim 4, characterized in that the electrically conducting element and the flux-guiding element adjacent to the head face are flat layer parts of a thin-film structure.

* * * * *